W. HARPER & W. SMITH.
Trolling Spoons.

No. 143,146. Patented September 23, 1873.

Witnesses.
J. West Wagner.
H. Rutherford.

Inventors.
William Harper,
William Smith,
By Johnson, Klaucke & Co.
their Attorneys.

UNITED STATES PATENT OFFICE.

WILLIAM HARPER AND WILLIAM SMITH, OF MONTREAL, CANADA.

IMPROVEMENT IN TROLLING-SPOONS.

Specification forming part of Letters Patent No. 143,146, dated September 23, 1873; application filed July 1, 1873.

*To all whom it may concern:*

Be it known that we, WILLIAM HARPER and WILLIAM SMITH, of the city of Montreal, in the district of Montreal, province of Quebec, in the dominion of Canada, have invented certain new and useful Improvements in Trolling-Spoons, of which the following is a specification:

Our invention relates to that class of baits or decoys used by fishermen, known as spinning-baits and trolling-spoons, wherein the bait consists of a piece of bright metal attached above the hook and arranged to revolve rapidly while it is being driven through the water in the kind of fishing called trolling. Our said invention consists of oppositely-revolving spinners or trolling spoons, and in the peculiar construction of said spinners, whereby they (being left and right handed) are made to spin in opposite directions as the bait dives through the water; and also in the construction and attachment of the spinners to the wire, by means of which they are continually kept in a transverse position.

Figure 1:
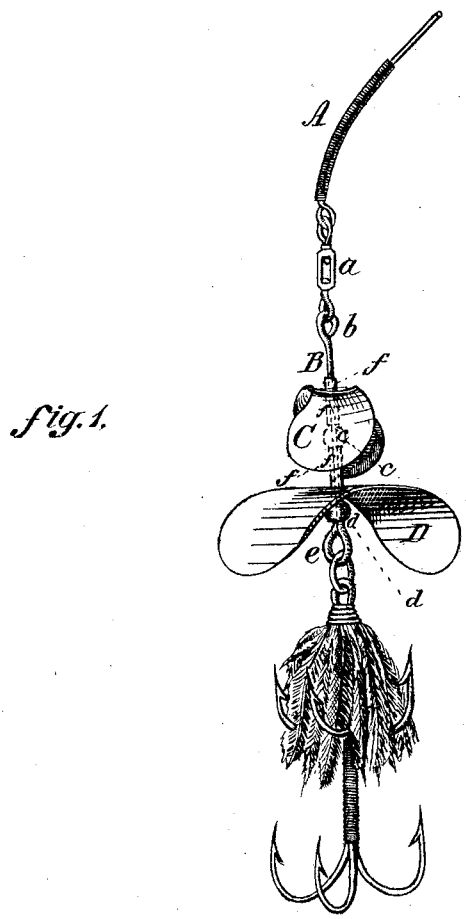
Figure 2:
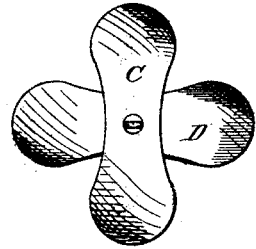
Figure 3:

In the accompanying drawings, Figure 1 represents an elevation of a fishing-tackle embracing our invention; Fig. 2, a top view, and Fig. 3 a perspective view, of one of the spinners.

The fishing-line A is attached to a shackle-link, a, connected by a loop, b, to the wire B, on which are placed, first, the top spinner C, then a glass bead, c, which acts as a bearing-surface upon which the spinner C revolves freely, and which separates it from the second spinner D, which follows next upon the wire. Immediately after the spinner D upon the wire B is another bead-washer, d, which has its lower bearing upon a loop, e, to which any preferred style of hook and fly may be attached. The spinners C and D are of a peculiar propeller-shape, shown in Fig. 3 of the drawings, and are made to revolve upon the wire B, and are so placed upon said wire as to have their sleeves f separated only by the bead or washer c, and, as will be seen by reference to the drawings, are right and left handed, so that in drawing or trolling the force of the water compels them to spin in opposite directions.

This construction and arrangement of spoons not only collects and holds the requisite degree of light, but insures in a masterly manner its proper dispersion.

It will be well understood by those who are adepts in the art of fishing that the size of the spinner must be regulated by the weight of the hook or hooks attached, and, therefore, that the spinner may, from the weight of the hooks, be required of considerable size. If, therefore, we compare a large spinner with a small one, although the rays of light reflected will be much larger, there will not be any greater dispersion of them. Our invention is therefore based on the theory that the success of the fisherman is not so much due to the amount of light as to its proper dispersion; to this end, if desired, a greater number of spinners than two may be used; but, as there is a practical limit to all things, a greater number than two is not found as beneficial in alluring fish.

By actual experiment with our double spinner it is found that by fishing with the two side by side, three fish on an average may be taken with the double spinner for one caught with the single or double one, arranged lengthwise upon the wire, as usual.

Having described our invention, we claim—

1. In trolling-baits the spinners C and D, arranged upon the wire B to revolve in opposite directions, when constructed substantially in the manner described.

2. The propeller-shaped spinners C D, constructed substantially as described and shown.

3. The spinners C and D in combination with the sleeves f and the wire B, substantially as described, and arranged to spin continuously and oppositely in moving through the water.

In testimony whereof we have hereunto set our hands in the presence of two subscribing witnesses, this 10th day June, A. D. 1873.

WILLIAM HARPER.
WILLIAM SMITH.

Witnesses:
GEO. R. W. KITTSON,
WM. F. LIGHTHALL.